Dec. 18, 1956   C. L. SPOONHOUR   2,774,460
QUICK-FREEZE CONVEYORS
Filed March 16, 1953   2 Sheets-Sheet 1
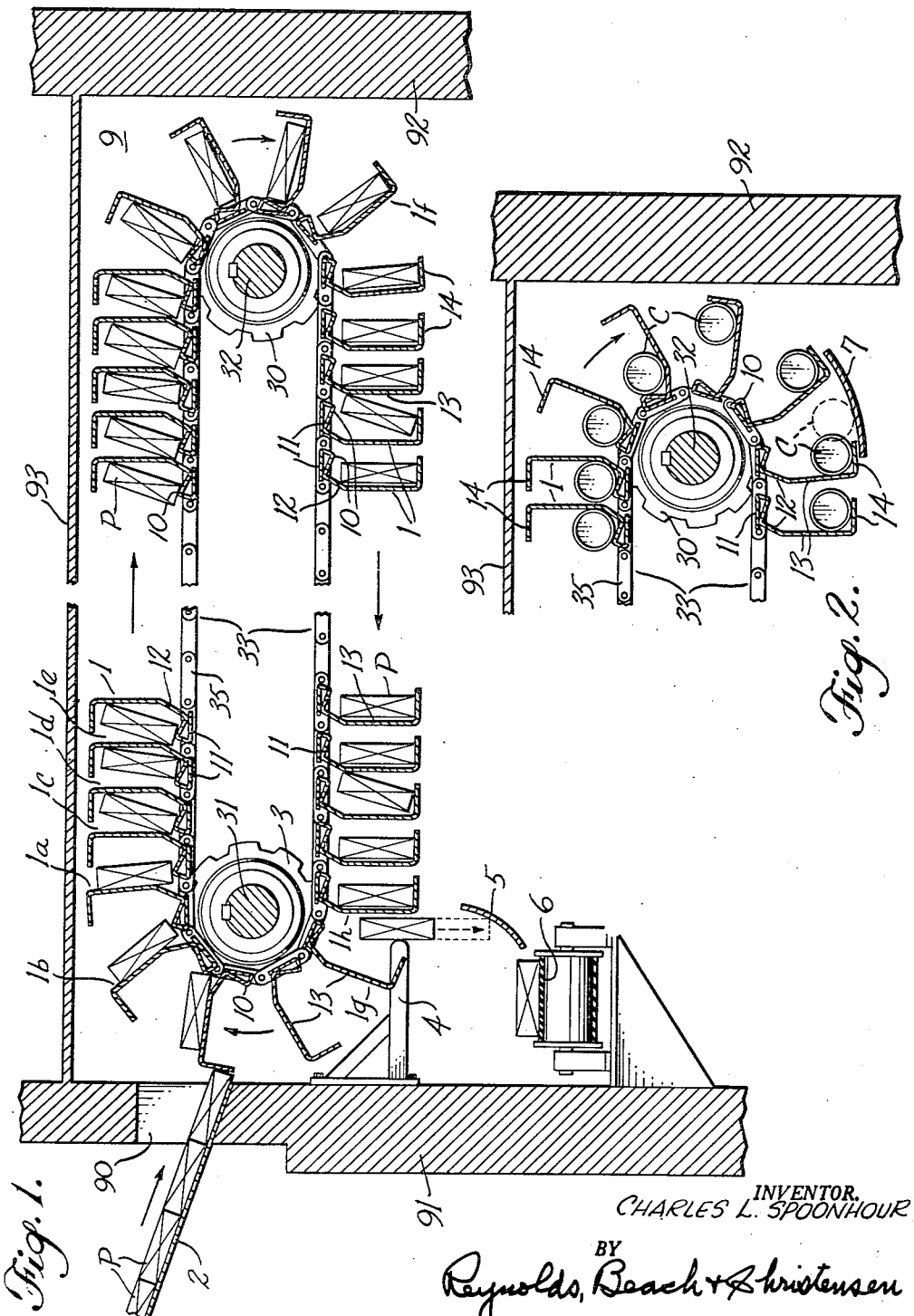
INVENTOR.
CHARLES L. SPOONHOUR
BY
Reynolds, Beach & Christensen
ATTORNEYS Dec. 18, 1956

C. L. SPOONHOUR 2,774,460

QUICK-FREEZE CONVEYORS

Filed March 16, 1953

INVENTOR.
CHARLES L. SPOONHOUR
BY Reynolds, Beach
+ Christensen
ATTORNEYS

United States Patent Office 2,774,460
Patented Dec. 18, 1956

2,774,460

QUICK-FREEZE CONVEYORS

Charles L. Spoonhour, Seattle, Wash.; Jean E. Spoonhour, administratrix of said Charles L. Spoonhour, deceased, assignor to Lewis Refrigeration & Supply Company, Seattle, Wash., a partnership Application March 16, 1953, Serial No. 342,481

6 Claims. (Cl. 198—131)

This invention concerns a conveyor, but more particularly a conveyor for use in the quick-freezing of packaged goods, such as peas, beans, etc. in rectangular packages of standard size and shape, or such as fruit juices in cans of standard cylindrical size and shape.

It is a primary object of this invention to provide a conveyor the parts whereof are of such size and shape, with relation to the size and shape of a standard package, particularly one which is rectangular, that the forces acting upon the package during its advance—gravity for example—will dispose it for the most part in line contact only with the conveyor parts that support it, leaving its surfaces spaced from adjacent conveyor surfaces for circulation of cold air to effect freezing.

Another object of this invention is to provide a conveyor of the nature indicated which in use will enclose such a standard package within a compartment between two blades during its passage along the horizontal runs of the conveyor, against the possibility of dropping out, but which will automatically effect such widening of the compartment at one edge, as the conveyor passes about the sprocket wheels at the ends of the horizontal runs and the blades separate at their outer ends, as will enable gravity entrance or exit of a package from each given compartment.

It is a characteristic of such packages, which are usually slightly moister as they enter the freezing chamber than the dry freezing air within, that they will tend to stick to any surface whereon they rest in full surface contact for any length of time, at least until their surface temperature has been reduced to about the temperature of the conveyor surfaces. It is a further object of this invention to provide a conveyor of the nature indicated which is so formed that, in relation to a package of standard size and shape, there can be no such surface contact until the required temperature reduction has been attained, but instead all support of the package is by edge contact only, in at least the first half of the package's travel.

It is also an object of this invention to provide a conveyor of such nature, and feed means, and preferably also discharge means, which can operate by gravity alone, whether to feed and discharge single packages, or more preferably, for handling multiple packages.

While the gravity feed and discharge is preferred, it is a further object to provide poker means to assist discharge at just the right time and place, such poker means operating in conjunction with the advance of the conveyor itself, and needing no timing nor moving parts.

It is an object to provide a conveyor of the general nature indicated which can handle alternatively certain standard rectangular packages or certain standard cylindrical packages, but when used for cylindrical packages it is an object to provide a retainer apron which will insure against the loss of a package by rolling from the compartment while passing about a sprocket wheel, at least until such discharge is desired.

Still another object is to provide a blade for use in such a conveyor which is of simple and inexpensive construction, and yet adequately rigid and strong.

With such objects in mind, and others as will appear hereinafter, this invention comprises the novel conveyor, and the novel arrangement and relationship of the parts thereof, and the novel components, all as shown in the accompanying drawings, and as will be described and claimed in this specification.

The drawings illustrate the invention embodied in a presently preferred form of construction.

Figure 1 is a sectional view, on a longitudinal vertical plane, through the freezing chamber and the conveyor therein, illustrating the preferred feed and discharge means.

Figure 2 is a similar but fragmentary view, showing a slight modification adapting the conveyor to the handling of cans.

Figure 3:
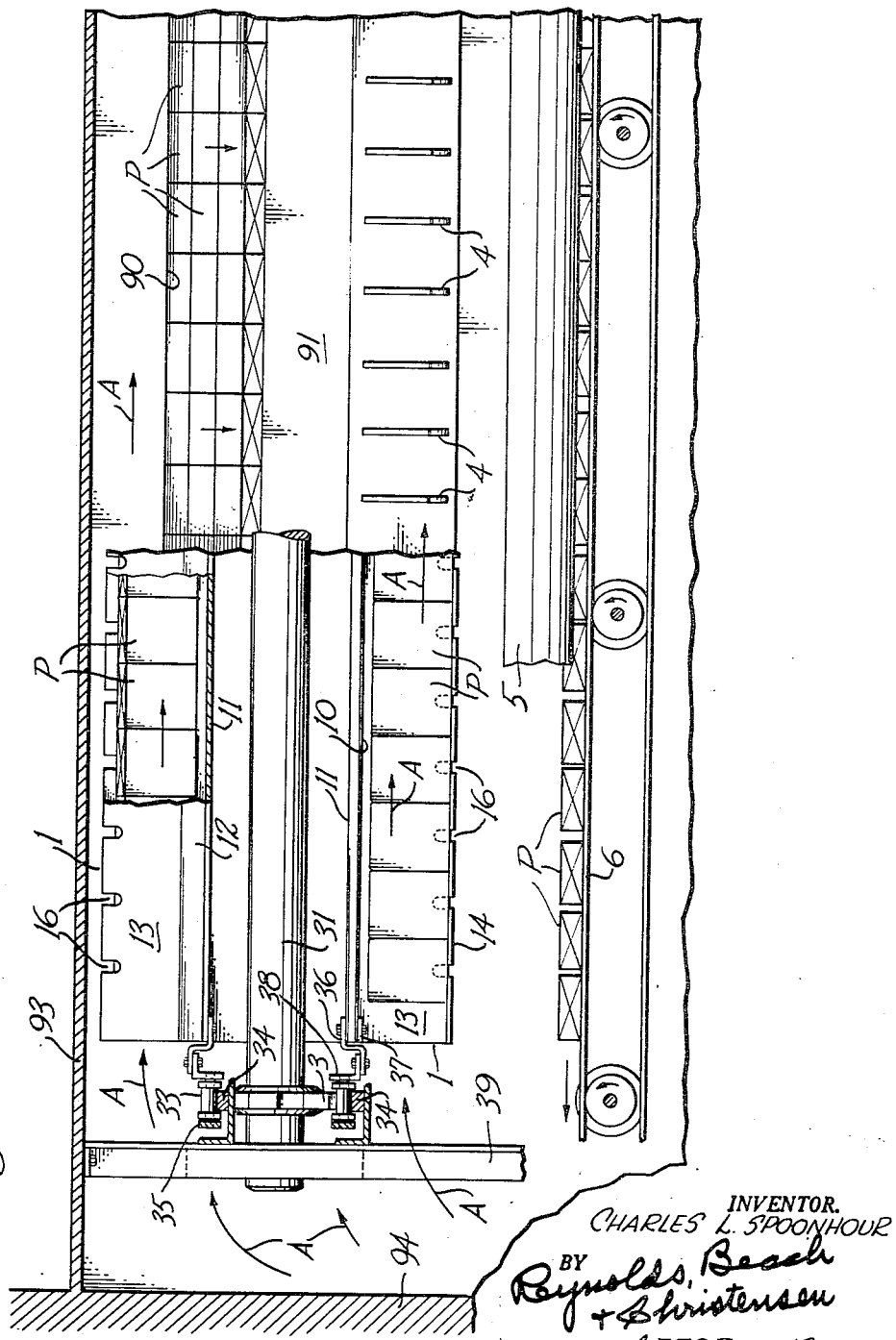
Figure 3 is a transverse sectional view of the freezer chamber and the conveyor, broken back in part to illustrate the feed and discharge means.

The freezer chamber 9 is defined by opposite end walls 91 and 92, side walls 94, and a top wall or partition 93. An opening 90 in the wall 91 constitutes an entrance or feed opening for packages, and a discharge opening (not shown) is formed in a side wall 94. By means of refrigerating coils, blowers and air deflectors of any suitable type (not shown) cold air is circulated through the chamber 9, and it is desired that the circulation be from one side to the other, that is, transversely of the chamber and of the conveyor therein, as is suggested by the arrows A in Figure 3.

Adjacent each end wall transverse shafts 31, 32 support sprocket wheels 3, 30, about which pass endless chains 33. While not strictly essential, it is preferable that the individual links 35 of each chain be of a length somewhat in excess of the thickness of the package which is to be handled by this conveyor; the reason for this will shortly appear. Moreover, the sprocket wheels 3, 30 are of relatively small diameter, compared to the length of these links, so that each link lies at an appreciable angle to adjoining links as they round a sprocket wheel. One of the shafts is driven in any suitable manner, and these shafts are preferably supported from framework 39 standing inside the walls of the chamber, to leave free space for air circulation outside such framework, as is best seen in Figure 3.

Paired links, one in each chain, are connected by individual blades 1, and these blades are spaced along the chains at intervals somewhat greater than the thickness of the package which is to be handled, that is, in the preferred arrangement, by intervals corresponding to the length of the links 35. Each blade has certain dimensions and proportions relative to the dimensions and shape of the package, as will be explained later in greater detail. These blades may be of such extent, transversely of the freezing chamber, as to handle only one, or many, packages, but as shown and as preferred the blades will receive and handle many such standard packages, placed end to end.

Such blades are preferably made of sheet metal. Their dimensions, proportions, and positions at certain stages being somewhat critical, it is necessary that the blades be reasonably stiff. For that reason, and in order that they may accomplish their functional ends, they are bent and formed in a special way. Each is formed with three principal portions, namely, a base portion 11, a connecting portion 13, and an outer flange portion 14. The base portion is bent in flat triangular shape, hence is quite stiff and rigid, and extends the entire length of the blade to lend rigidity to the blade as a whole. Outwardly of the base portion 11 the connecting portion 13 is in the main directed outwardly from the chain in a plane which, when the chains are passing about the sprocket wheels, is substantially radial, and which, when the chains are in their horizontal runs, is substantially vertical. The blade's outer flange portion 14 is bent rearwardly, relative to the sense of advance, and this outer flange portion is substantially horizontal when the chains are passing through their horizontal runs, that is, it generally parallels the runs of the chain. Intermediate the base portion 11 and the connecting portion 13 there is a part of the connecting portion, designated 12, which meets the main part of the connecting portion 13 at a wide obtuse angle. The connecting portion 13 is of a height slightly less than the height of the package P which is to be handled, and the part 12 is materially less than the height of the package P; together, the parts 12 and 13 exceed the package's height, but neither is individually of that height, and preferably the smaller part 12 is less than half the package's height. The outer flange portion 14 may be of a breadth greater than the thickness of the package, but primarily it is of such breadth that when the parts are in their horizontal runs the edge of the outer portion is so near the next following blade that the gap left is too small for a package to be slipped in or out of the compartment formed between these two blades. It will be noted that the shape and disposition of the triangular base portion 11 is such as to leave a nose 10 at the rearmost or trailing part of this base.

The cross-sectional shape of the blade 1 as a whole is five-sided, the outward surface of the base portion 11 being inclined and approximately the same width as the package or slightly greater, the smaller part 12 of the connecting portion being approximately at right angles to the base's said surface, and of a height considerably less than the height of the package, and joining the main part of the connecting portion 13 at a wide obtuse angle; the main part 13 of the connecting portion is somewhat less in height than the height of the package, and the outer portion 14 is directed substantially at right angles to the portion 13 and is of a width such with relation to the width of the package, that it approaches closely the next following blade; the fifth side of the compartment is open, or may be considered to be formed by the two-part connecting portion of the next following blade.

The ends of each blade are secured to each of two paired links 35 in the respective chains 33. The connection is a rigid one, as is suggested by the complemental clamping pieces 36, 37, and the angle-iron support 38 secured to the link 35. The purpose of such a rigid connection is to keep each blade and the several parts thereof each in its correct disposition relative to the horizontal runs of the chain 33 and to the sprocket wheels 3, 30, and hence to all other blades, as the conveyor advances slowly through the freezing chamber 9. The same end is furthered by supporting the runs of the chain, intermediate the sprocket wheels, upon rails 34, held on brackets from the framework 39, so that these horizontal runs are kept exactly level in all parts.

Preferably, for simplicity, the feed opening or entrance 90 constitutes the terminal of a gravity chute 2, down which packages slide, each in contact with the package ahead, ready to slide down upon the blades as the latter arrive in receiving position. As has been said, each blade may be of transverse extent to receive only one or a small number of packages, although it is preferable and more economical to make it of such extent that it will receive quite an appreciable number of packages, say a couple of dozen, placed end to end. The feed chute 2 and the entrance 90 must, of course, be equally wide. However, a description of the operation as applied to a single package will describe as well the operation as applied to any number of packages.

The packages on the feed chute 2 will be urged downwardly, towards the conveyor, by the pressure of the packages behind, or by other means. So long as a blade has its outer portion 14 positioned as in Figure 1, to intercept and hold back the following packages, none can enter. The movement of the conveyor is quite slow, perhaps a foot a minute, which allows ample time to move packages endwise into feeding position. As soon as the outer portion 14 of a blade has cleared the held-back packages, the next row of packages slides down into the space between the blade which has just passed and the next following blade; the latter has by now advanced to a position wherein it is horizontal or nearly so, or even inclined slightly inwardly, to retain the package. The bottom of each package comes to rest in engagement with the nose 10 of the next preceding blade, and with its one side resting flat upon the connecting portion 13 of the following blade.

This broad surface engagement, if left undisturbed, would freeze the package to the surface in a short time, and so could not be tolerated, especially as it is intended that the packages shall shift position before and during discharge, and that the freezing of the package should be accomplished by the circulation of cold air in contact directly with all surfaces of the package (except their ends which abut the ends of adjacent packages). However, the broad surface engagement is not left undisturbed for long, due to the relative movement of the two blades, as first the one and then the other rounds the small-diameter sprocket wheel 3 and starts along the upper horizontal run of the conveyor. The nose 10 of the blade 1a which has completed its rounding of the sprocket wheel 3 is still in engagement with the package which still rests upon the following blade 1b, but the latter is closing the gap between itself and the blade 1a, hence there is relative even if slight radial movement between the nose of blade 1a and the radial portion of blade 1b, as can be seen by comparison of the positions of these two packages. This relative radial movement pushes the package outwardly along the blade 1b whereon it rests, so that it will not stick thereto.

By now the package which originally rested upon the blade 1a is vertically upright, resting upon the nose 10 of the next preceding blade 1c. It will not retain this position, indeed the approach of the blade 1a to the blade 1c which accompanies the completion of the rounding of the sprocket wheel 3 pushes the package to an unbalanced position, and it topples forwardly, until its upper forward edge rests against the connecting portion 13 of the blade ahead, as indicated at 1d. The bottom of the package may or may not slide forwardly, but if it does not, the slope of the base portion of the blade 1d is such, with relation to the size and shape of the package, that the package's bottom does not rest flat upon this inclined package-supporting surface of the base of blade 1d, but instead remains in line contact only with the nose 10, and air space is left between the bottom of the package and the base portion 11 whereon it is supported. In the usual case the bottom of the package will slide forwardly, until the lower rear edge of the package has passed the nose 10, and its lower forward edge has come into contact with the part 12 of the connecting portion of the blade ahead of the package, as is the package which is supported by the blade 1e. In this latter case the shape and size of the blade and its parts relative to the size and shape of the package leaves the package in edge contact with the blade at three lines of contact, with plenty of air space between the walls of the package and the blade.

The positions just described are maintained during the advance along the upper horizontal run of the conveyor. This advance may take thirty minutes, or if duplicate conveyors are employed, it may take fifteen minutes; these figures are illustrative only, but figured to leave the package within the freezing chamber an hour, at a feed rate of a foot a minute.

These same positions are maintained as the blades round the sprocket wheel 30 at the distant end of the conveyor, except that any package which has not by now slid forwardly to contact the part 12 will now slide thus.

Also, as the blade passes beyond the horizontal position, all packages will slide downwardly along the parts 12 and 13 of the connecting portion to come to rest upon the outer portion 14 of its blade, as at 1f whereon it will rest in upright position during the return journey along the lower horizontal run of the conveyor. It will be noted that, the part 13 being of less height than the height of the package, the package's now upper forward edge will contact the obtusely angled part 12, and the package as a whole will be thereby held away from the blade's part 13. In a few cases the package may topple until its upper rear corner contacts the following blade, but this leaves it supported by two lines of contact, with ample room about it for air circulation, and it is always impossible for a package to drop out of its compartment, because the gap between the edge of the outer flange portion 14 of one blade and the next following blade is too narrow. The package will normally rest upright upon the inner package-supporting surface of the outer flange portion 14 of its blade, but this surface contact by now will not cause the package to freeze and stick, simply because the package is no longer moist, but is of the same temperature, on its surface at least, as the surrounding atmosphere and the supporting flange portion 14; the minor loss of free surface for air circulation is of lesser importance at this stage.

As a package reaches the end of the lower run of the conveyor the blade 1g ahead has begun to round the small-diameter sprocket wheel 3, and since the blade's connecting portion 12, 13 is so rigidly held that its part 13 tends always to remain in a radial plane, that blade ahead swings ahead of the blade 1h which has not yet begun to round the sprocket wheel. The gap between the edge of the outer flange portion 14 of blade 1g and blade 1h widens materially, enough to permit exit of the package which until now was supported on blade 1g. Its exit may occur because of the effects of gravity and the increasing slope of the flange portion 14 of blade 1g, but this would not insure exit of the packages at a uniform place. Where uniformity is desired, a poker 4, or as many such pokers as there are packages on a blade, may be positioned to contact the package and to push it from its resting place upon the blade. The blades in such case are notched, as indicated at 16, for entrance of the poker. By these or like means all packages are disengaged at the same time from their blade, and drop through the widened gap; they may be deflected by a deflector 5 to turn them through a right angle, so that they may come to rest flatwise upon a belt conveyor 6, by which they are conveyed to a discharge opening (not shown) or other place, where they are packed in cartons or otherwise disposed of.

It will be clear now that the size and shape of the conveyor and its parts bear a very definite relation to the size and shape of the package which is to be conveyed. By maintaining such relationship flatwise contact of the package with any part of the conveyor during a period or for so long as would permit freezing of the package to the conveyor surface is prevented. By the same relationship it is assured that the surfaces of the package will always, so long as it is material, have line contact only with the surfaces of the conveyor, and that there will be ample air space around the package, and over most of its surfaces, to enable circulating air A, moving lengthwise of the blades, to contact freely all these surfaces of every package. If the size and shape of a package varies materially from that for which the conveyor is designed, the conveyor, or its blades, will have to be changed to conform. However, any given processor will ordinarily adopt a given size and shape of package as standard, hence redesign or changing of conveyors will be the exception rather than the rule.

It has been assumed that the package to be frozen is rectangular, and probably most would be. The conveyor is capable, however, of handling a cylindrical package, such as cans C, shown in Figure 2, provided its diameter is not greatly different from the thickness of the rectangular package, nor, specifically, greater than the width of the individual package-receiving compartment. Such cans enter in just the same way from a feed chute 2, and upon closing the gap between blades they are held securely between blades, resting, in the upper run, against the base 11, the part 12 of the connecting portion, and perhaps also the radial part 13 thereof, but always with only line contact. As the conveyor turns around the sprocket wheel 30 and the connecting portion 13, 12 slopes downwardly, the can will roll down to rest against the outer flange portion 14. As this flange portion 14 approaches its horizontal position, with the gap between blades still open wide, there is the possibility that a can may roll off its support and drop from the conveyor. To prevent this a retainer apron 7 is placed close to the peripheral path of the outer portions 14; this will support any can which may roll off its moving support until the following blade, in closing the gap, pushes that can back onto its support 14, and retains it there.

It will be evident that packages which leave the conveyor may, instead of dropping upon an off-bearing conveyor 6, be delivered to a duplicate of the principal conveyor, and carried thereby for a second run through the freezing chamber. The advantage of so doing is that it permits shortening of the freezer chamber as a whole, with certain economies in construction and operation. This, however, is an optional and obvious variation which still embodies the novel principles of this invention.

The invention has been described in connection with freezing of packaged goods, and is especially suited for such use. It might be used for drying or heating of packaged goods, or for sterilization or other treatment thereof. Thus, while especially adapted and claimed as used for freezing, it is to be understood that the invention's novel features are intended to be protected for such alternative uses, such as those to which these novel features adapt it.

I claim as my invention:

1. A conveyor especially suited for the conveyance of generally rectangular packages of standard size and shape each of which has a flat side face defining the thickness of the package, while the contents thereof are being frozen, comprising an endless chain and sprocket wheels over which said chains run, the whole arranged with the chain's upper and lower runs generally horizontally disposed, and blades spaced along said chain at intervals somewhat exceeding the thickness of the package, each blade including three rigidly connected portions, namely, an inner base portion secured rigidly to a chain link, and having an upper package-supporting surface slanted, in the upper run, downwardly and forwardly with respect to the direction of advance, a connecting portion extending in the main approximately at a right angle to the chain's upper run, from the forward edge of the base portion's slanted package-supporting of surface, being that edge which is nearer the chain, and said connecting portion being of a height overall somewhat in excess of the height of the package, and an outer flange portion extending rearwardly from the outer edge of the connecting portion back over the base portion, and generally at a right angle to said connecting portion, and being of a width to leave less spacing between itself and the next blade, in the horizontal runs of the chain, than the thickness of the package, the spacing between connecting portions of sucessive blades being such, with relation to the upright dimension of the package, that with the package's side face resting upon the base's slanted package-supporting surface the upper forward edge of the package will lean against the upright connecting portion of the same blade.

2. A conveyor as in claim 1, characterized in that the connecting portion of each blade has a short inner surface and a longer outer surface, its inner surface adjoining the inner, forward edge of the base portion's slanted package-supporting surface, being approximately at a right angle to that slanted package-supporting surface, and of a width materially less than the height of the package, and the longer outer surface being oriented generally at a right angle to the runs of the chain, and of a width somewhat less than the height of the package.

3. A conveyor especially suited for the conveyance of packages of standard size and shape while the contents thereof are being frozen, comprising an endless chain and sprocket wheels over which said chains run, the whole arranged with the chain's upper and lower runs generally horizontally disposed, and blades spaced along said chain at intervals such as afford space between successive blades corresponding generally to the thickness of the package, each blade including three rigidly connected portions, namely, a base portion secured rigidly to a chain link and having an upper surface slanted in the upper run from the horizontal, a connecting portion extending in the main approximately at a right angle to the chain's upper run, from that edge of the base portion's slanted surface which is nearer the chain, and of a height overall somewhat in excess of the height of the package, and an outer flange portion extending from the outer edge of the connecting portion back over the base portion, and generally at a right angle to said connecting portion, and being of a width to leave a gap between itself and the next blade in the horizontal runs of the chain less than the thickness of the package, each blade being notched in its outer portion in a position corresponding to a location of a package, and a poker fixedly located in the path of such notch where the blade's outer portion begins to rise and slope as the blade rises and its outer edge separates from the folowing blade in passing about a sprocket wheel, such poker serving to enter and to poke the package from the blade by reason of their continued advance.

4. A conveyor especially for packages of standard size and generally rectangular shape which are to be frozen, comprising two spaced-apart endless chains the runs whereof are generally horizontal, and the links whereof are longer than the thickness of the package, sprocket wheels over which said chains run at the opposite ends of the conveyor, and blades connecting each pair of links in the respective chains, each blade comprising a base portion which is rigidly secured to the chain links and which is formed with a package-supporting surface that slopes forwardly and downwardly, when the blade is in its upper run and relative to the sense of advance, from a nose which is adjacent the next following blade, a connecting portion outwardly of said base portion which in the main is directed outwardly in a generally radial plane as the blade passes about said sprocket wheels, said connecting portion having a part located intermediate said base portion and said radial part, and sloped at a wide obtuse angle to the radial part, the connecting portion and the radial portion conjointly but neither one individually being of a height in excess of the height of the package, and the blade having an outer flange portion extending generally horizontally when the blade is in a horizontal run, and directed rearwardly, relative to the sense of advance, close enough to the following blade to leave a gap less than the thickness of the package when the blade is in a horizontal run, but the diameter of the sprocket wheels being small enough to effect widening of such gap sufficiently for insertion and removal of packages while the chains and blades are passing about said sprocket wheels.

5. A conveyor especially for packages of standard size and generally rectangular shape which are to be frozen, comprising two spaced-apart endless chains, the runs whereof are generally horizontal and the links whereof are longer than the thickness of the package, sprocket wheels over which said chains run at the opposite ends of the conveyor, and blades each formed of a sheet of metal bent upon itself in triangular form to define a base portion connecting each pair of links in the respective chains, and having a nose at the rear, with relation to the sense of advance, and a package-supporting surface which slopes forwardly and downwardly when such blade is in an upper run of the conveyor, the sheet of metal being also bent outwardly from the forward portion of the base to define a connecting portion of the blade oriented substantially at right angles to the horizontal run of the chain, an inner part of said connecting portion extending outwardly from the base to a distance less than half the height of the package, and an outer main part of said connecting portion being bent outwardly at a wide obtuse angle from the inner part thereof, and extending outwardly thence to a distance slightly less than the height of the package, and the sheet metal of the blade being finally bent at right angles to the main part of the connecting portion, and extending thence to a distance in excess of the thickness of the package to define an outer portion, the connecting portions of the several blades being directed outwardly in generally radial planes as the blades pass about said sprocket wheels, and the spacing of said blades in the sense of advance being in excess of the thickness of a package, but close enough together to leave a gap between their outer portions less than the thickness of the package when the blade is in a horizontal run, but the diameter of the sprocket wheels being small enough to effect widening of such gap sufficiently for insertion and removal of packages while the chains and blades are passing about said sprocket wheels.

6. A conveyor of the nature defined in claim 1, wherein the base portion of each blade is formed with a nose at its rear, relative to the sense of advance, which when parts are in the upper horizontal run projects upwardly from the rear part of the base portion in substantial alignment with the connecting portion of the following blade.

References Cited in the file of this patent

UNITED STATES PATENTS

| Number | Name | Date |
|---|---|---|
| 807,687 | Schirmer | Dec. 19, 1905 |
| 1,150,302 | Perkins et al. | Aug. 17, 1915 |
| 1,455,434 | Ellrich | May 15, 1923 |
| 1,562,560 | Hormel | Nov. 24, 1925 |
| 2,002,720 | Smith | May 28, 1935 |
| 2,263,811 | Lipkin | Nov. 25, 1941 |

FOREIGN PATENTS

| 701,593 | Germany | Jan. 20, 1941 |